US009830193B1

(12) United States Patent
Wagner et al.

(10) Patent No.: US 9,830,193 B1
(45) Date of Patent: Nov. 28, 2017

(54) AUTOMATIC MANAGEMENT OF LOW LATENCY COMPUTATIONAL CAPACITY

(71) Applicant: Amazon Technologies, Inc., Seattle, WA (US)

(72) Inventors: Timothy Allen Wagner, Seattle, WA (US); Sean Philip Reque, Everett, WA (US); Dylan Chandler Thomas, Seattle, WA (US); Derek Steven Manwaring, Lynnwood, WA (US); Bradley Nathaniel Burkett, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 14/502,714

(22) Filed: Sep. 30, 2014

(51) Int. Cl.
*G06F 9/45* (2006.01)
*G06F 9/50* (2006.01)
*G06F 9/455* (2006.01)

(52) U.S. Cl.
CPC ........ *G06F 9/5077* (2013.01); *G06F 9/45533* (2013.01); *G06F 2009/45562* (2013.01)

(58) Field of Classification Search
CPC ..... G06F 9/50–9/5077; G06F 9/455–9/45558; G06F 2009/45562–2009/45595
See application file for complete search history.

(56) References Cited

U.S. PATENT DOCUMENTS

| 5,283,888 A | 2/1994 | Dao et al. |
| 5,970,488 A | 10/1999 | Crowe et al. |
| 6,708,276 B1 | 3/2004 | Yarsa et al. |
| 7,036,121 B1 | 4/2006 | Casabona et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |

(Continued)

FOREIGN PATENT DOCUMENTS

| EP | 2663052 A1 | 11/2013 |
| WO | WO 2009/137567 A1 | 11/2009 |

(Continued)

OTHER PUBLICATIONS

Anonymous: "Adapter pattern—Wikipedia, the free encyclopedia", Apr. 4, 2015 (Apr. 4, 2015). XP055275559, Retrieved from the Internet: URL:https://en.wikipedia.org/w/index.php?title=Adapter_pattern&oldid=654971255 [retrieved on May 26, 2016] the whole document.

(Continued)

*Primary Examiner* — Matthew Brophy
(74) *Attorney, Agent, or Firm* — Knobbe, Martens, Olson & Bear, LLP

(57) ABSTRACT

A system for providing automatic management of low latency computational capacity is provided. The system may be configured to maintain a plurality of virtual machine instances. The system may be further configured to identify a trend in incoming code execution requests to execute program code on a virtual compute system, determine, based on the identified trend, that the plurality of virtual machine instances should be adjusted, and adjust the plurality of virtual machine instances based on the identified trend.

22 Claims, 4 Drawing Sheets

(56) References Cited

U.S. PATENT DOCUMENTS

| | | |
|---|---|---|
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,065,676 B1 | 11/2011 | Sahai et al. |
| 8,095,931 B1 | 1/2012 | Chen et al. |
| 8,146,073 B2 | 3/2012 | Sinha |
| 8,166,304 B2 | 4/2012 | Murase et al. |
| 8,171,473 B2 | 5/2012 | Lavin |
| 8,219,987 B1 | 7/2012 | Vlaovic et al. |
| 8,321,554 B2 | 11/2012 | Dickinson |
| 8,336,079 B2 | 12/2012 | Budko et al. |
| 8,429,282 B1 | 4/2013 | Ahuja |
| 8,448,165 B1 | 5/2013 | Conover |
| 8,613,070 B1 | 12/2013 | Borzycki et al. |
| 8,631,130 B2 | 1/2014 | Jackson |
| 8,694,996 B2 | 4/2014 | Cawlfield et al. |
| 8,725,702 B1 | 5/2014 | Raman et al. |
| 8,756,696 B1 | 6/2014 | Miller |
| 8,769,519 B2 | 7/2014 | Leitman et al. |
| 8,819,679 B2 | 8/2014 | Agarwal et al. |
| 8,825,964 B1 | 9/2014 | Sopka et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 6/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,223,966 B1 | 12/2015 | Satish et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 | 1/2017 | Reque et al. |
| 9,588,790 B1 | 3/2017 | Wagner et al. |
| 9,600,312 B2 | 3/2017 | Wagner et al. |
| 9,652,306 B1 | 5/2017 | Wagner et al. |
| 9,678,773 B1 | 6/2017 | Wagner et al. |
| 9,678,778 B1 | 6/2017 | Youseff |
| 2002/0172273 A1 | 11/2002 | Baker et al. |
| 2003/0071842 A1 | 4/2003 | King et al. |
| 2003/0084434 A1 | 5/2003 | Ren |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0242647 A1 | 10/2006 | Kimbrel et al. |
| 2006/0248195 A1 | 11/2006 | Toumura et al. |
| 2007/0094396 A1* | 4/2007 | Takano ............... H04L 67/1008 709/226 |
| 2007/0130341 A1* | 6/2007 | Ma ............... G06F 1/26 709/226 |
| 2007/0255604 A1 | 11/2007 | Seelig |
| 2008/0028409 A1 | 1/2008 | Cherkasova et al. |
| 2008/0082977 A1* | 4/2008 | Araujo ............... G06F 9/455 718/1 |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1* | 8/2008 | Schmidt ............... G06F 11/203 711/6 |
| 2008/0201711 A1 | 8/2008 | Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0099551 A1 | 4/2011 | Fahrig et al. |
| 2011/0134761 A1 | 6/2011 | Smith |
| 2011/0141124 A1 | 6/2011 | Halls et al. |
| 2011/0153838 A1 | 6/2011 | Belkine et al. |
| 2011/0154353 A1 | 6/2011 | Theroux et al. |
| 2011/0184993 A1 | 7/2011 | Chawla et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1* | 5/2012 | Adlung ............... G06F 9/5077 709/223 |
| 2012/0110164 A1* | 5/2012 | Frey ............... G06F 9/5077 709/224 |
| 2012/0110588 A1* | 5/2012 | Bieswanger ............... G06F 8/65 718/104 |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0151648 A1 | 6/2013 | Luna |
| 2013/0179574 A1* | 7/2013 | Calder ............... G06F 9/5033 709/226 |
| 2013/0179881 A1 | 7/2013 | Calder et al. |
| 2013/0179894 A1* | 7/2013 | Calder ............... G06F 9/5027 718/104 |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |

(56) References Cited

U.S. PATENT DOCUMENTS

| | | |
|---|---|---|
| 2013/0205092 A1 | 8/2013 | Roy et al. |
| 2013/0219390 A1 | 8/2013 | Lee et al. |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0263117 A1 | 10/2013 | Konik et al. |
| 2013/0297964 A1* | 11/2013 | Hegdal .............. G06F 11/0712 714/2 |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0347095 A1 | 12/2013 | Barjatiya et al. |
| 2014/0007097 A1 | 1/2014 | Chin et al. |
| 2014/0019965 A1* | 1/2014 | Neuse ................ G06F 9/45533 718/1 |
| 2014/0019966 A1* | 1/2014 | Neuse ................ G06F 9/45533 718/1 |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0380085 A1 | 12/2014 | Rash et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0120928 A1 | 4/2015 | Gummaraju et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0261578 A1 | 9/2015 | Greden et al. |
| 2015/0289220 A1 | 10/2015 | Kim et al. |
| 2015/0350701 A1 | 12/2015 | Lemus et al. |
| 2015/0363181 A1 | 12/2015 | Alberti et al. |
| 2015/0378765 A1 | 12/2015 | Singh et al. |
| 2016/0012099 A1 | 1/2016 | Tuatini et al. |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0164762 A1 | 6/2016 | Reque et al. |
| 2016/0164797 A1 | 6/2016 | Reque et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0294614 A1 | 10/2016 | Searle et al. |
| 2016/0299790 A1 | 10/2016 | Thompson |
| 2016/0301739 A1 | 10/2016 | Thompson |
| 2016/0371127 A1 | 12/2016 | Antony et al. |
| 2017/0090961 A1 | 3/2017 | Wagner et al. |
| 2017/0116051 A1 | 4/2017 | Wagner et al. |
| 2017/0177391 A1 | 6/2017 | Wagner et al. |
| 2017/0177413 A1 | 6/2017 | Wisniewski et al. |
| 2017/0199766 A1 | 7/2017 | Wagner et al. |

FOREIGN PATENT DOCUMENTS

| | | |
|---|---|---|
| WO | WO 2016/053950 A1 | 4/2016 |
| WO | WO 2016/053968 A1 | 4/2016 |
| WO | WO 2016/053973 A1 | 4/2016 |
| WO | WO 2016/090292 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |

OTHER PUBLICATIONS

Anonymous: "Shim (computing)—Wikipedia, the free encyclopedia", Apr. 4, 2015, XP055275558, Retrieved from the Internet: URL:https://en.wikipedia.org/w/index.php?title=Shim_(computing)&oldid=654971528 [retrieved on May 26, 2016] the whole document.

Espadas et al. "A tenant-based resource allocation model for scaling Software-as-a-Service applications over cloud computing infrastructures." Future Generation Computer Systems 29.1 (2013): 273-286.Retrieved on [Apr. 21, 2016] Retrieved from the Internet: URLhttp://www.sciencedirect.com/science/articie/pii/S0167739X1100210X.

Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.

International Search Report and Written Opinion in PCT/US2015/052810 dated Dec. 17, 2015, 18 pages.

International Search Report and Written Opinion in PCT/US2015/052838 dated Dec. 18, 2015, 23 pages.

International Search Report and Written Opinion in PCT/US2015/052833 dated Jan. 13, 2016, 17 pages.

International Search Report and Written Opinion in PCT/US2015/064071 dated Mar. 16, 2016, 17 pages.

International Search Report and Written Opinion in PCT/US2016/016211 dated Apr. 13, 2016 11 pages.

International Search Report and Written Opinion in PCT/US2016/026514 dated Jun. 8, 2016, 20 pages.

International Search Report and Written Opinion in PCT/US2016/026520 dated Jul. 5, 2016.

Czajkowski, G., and L. Daynes, Multitasking Without Compromise: A Virtual Machine Evolution 47(4a):60-73, ACM SIGPLAN Notices—Supplemental Issue, Apr. 2012.

Dombrowski, M., et al., Dynamic Monitor Allocation in the Java Virtual Machine, JTRES '13, Oct. 9-11, 2013, pp. 30-37.

Nakajima, J., et al., Optimizing Virtual Machines Using Hybrid Virtualization, SAC '11 Mar. 21-25, 2011, TaiChung, Taiwan, pp. 573-578.

Qian, H., and D. Medhi, et al., Estimating Optimal Cost of Allocating Virtualized Resources With Dynamic Demand, ITC 2011, Sep. 2011, pp. 320-321.

Vaghani, S.B., Virtual Machine File System, ACM SIGOPS Operating Systems Review 44(4):57-70, Dec. 2010.

Zheng, C., and D. Thain, Integrating Containers into Workflows: A Case Study Using Makeflow, Work Queue, and Docker, VTDC '15, Jun. 15, 2015, Portland, Oregon, pp. 31-38.

International Search Report and Written Opinion in PCT/US2016/054774 dated Dec. 16, 2016.

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

Ben-Yehuda et al., "Deconstructing Amazon EC2 Spot Instance Pricing", ACM Transactions on Economics and Computation 1.3, 2013, 15 pages.

Hoffman, Auto scaling your website with Amazon Web Services (AWS)—Part 2, Cardinalpath, Sep. 2015, 15 pages.

International Preliminary Report on Patentability in PCT/US2015/052810 dated Apr. 4, 2017.

(56) References Cited

OTHER PUBLICATIONS

International Preliminary Report on Patentability in PCT/US2015/052838 dated Apr. 4, 2017.
International Preliminary Report on Patentability in PCT/US2015/052833 dated Apr. 4, 2017.
International Preliminary Report on Patentability in PCT/US2015/064071 dated Jun. 6, 2017.
International Search Report and Written Opinion in PCT/US2016/066997 dated Mar. 20, 2017.
International Search Report and Written Opinion in PCT/US/2017/023564 dated Jun. 6, 2017.

* cited by examiner

AUTOMATIC MANAGEMENT OF LOW LATENCY COMPUTATIONAL CAPACITY

The present application's Applicant is concurrently filing the following U.S. patent applications on Sep. 30, 2014:

| | Title |
|---|---|
| 14/502,589 | MESSAGE-BASED COMPUTATION REQUEST SCHEDULING |
| 14/502,810 | LOW LATENCY COMPUTATIONAL CAPACITY PROVISIONING |
| 14/502,992 | THREADING AS A SERVICE |
| 14/502,648 | PROGRAMMATIC EVENT DETECTION AND MESSAGE GENERATION FOR REQUESTS TO EXECUTE PROGRAM CODE |
| 14/502,741 | PROCESSING EVENT MESSAGES FOR USER REQUESTS TO EXECUTE PROGRAM CODE |
| 14/502,620 | DYNAMIC CODE DEPLOYMENT AND VERSIONING |

The disclosures of the above-referenced applications are hereby incorporated by reference in their entireties.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
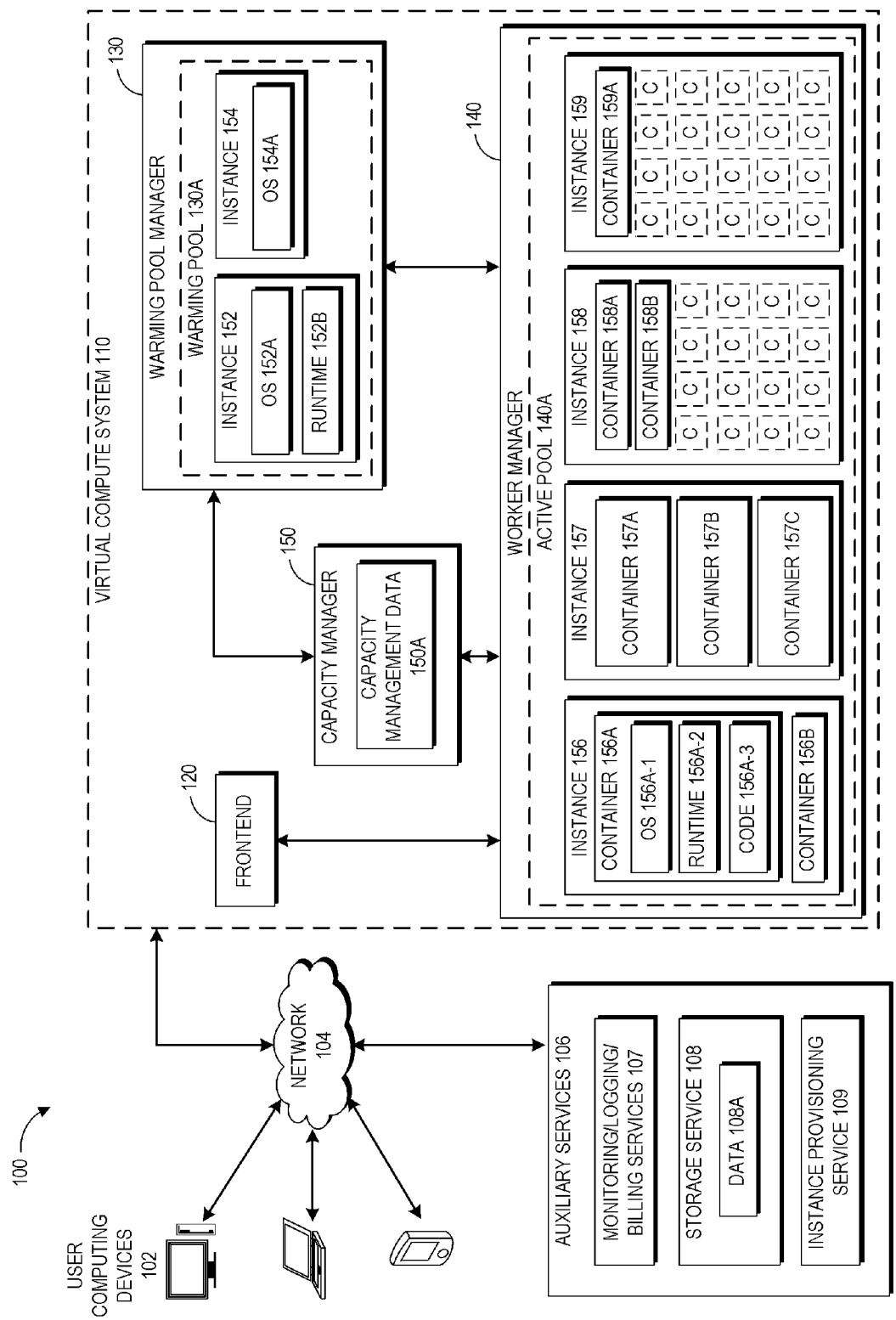
FIG. 1 is a block diagram depicting an illustrative environment for providing low latency compute capacity, according to an example aspect.

Companies and organizations no longer need to acquire and manage their own data centers in order to perform computing operations (e.g., execute code, including threads, programs, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Thus, an improved method of allowing users to take advantage of the virtual machine instances provided by service providers is desired.

According to aspects of the present disclosure, by maintaining a pool of pre-initialized virtual machine instances that are ready for use as soon as a user request is received, and automatically managing the amount of capacity available in the pool to service incoming requests, delay (sometimes referred to as latency) associated with executing the user code (e.g., instance and language runtime startup time) can be significantly reduced, and utilization can be improved.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. The virtual machine instances in the pool can be designated to service user requests to execute program codes. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g. by executing the user code in one or more containers created on the virtual machine instances) is significantly reduced.

In another aspect, a virtual compute system may monitor incoming requests to execute user code on the virtual compute system and as well as the pool of virtual machine instances on the virtual compute system, and based on the monitoring, the virtual compute system may adjust the pool of virtual machine instances in order to improve availability and utilization. The pool of virtual machine instances may include a warming pool of virtual machine instances having one or more software components loaded thereon and waiting to be used for handling an incoming request, and an active pool of virtual machine instances that are currently being used to handle one or more requests.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, a worker manager 140, and a capacity manager 150. In the depicted example, virtual machine instances ("instances") 152, 154 are shown in a warming pool 130A managed by the warming pool manager 130, and instances 156, 157, 158, 159 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 157, 158, 159 can be implemented on one or more physical computing devices in different various geographic regions. Similarly, each of the frontend 120, the warming pool manager 130, the worker manager 140, and the capacity manager 150 can be implemented across multiple physical computing devices. Alternatively, one or more of the frontend 120, the warming pool manager 130, the worker manager 140, and the capacity manager 150 can be implemented on a single physical computing device. In some embodiments, the virtual compute system 110 may comprise multiple frontends, multiple warming pool managers, multiple worker managers, and/or multiple capacity managers. Although six virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof) In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); and etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users, An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In the example illustrated in FIG. 1, user codes are executed in isolated compute systems referred to as containers. Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance).

As shown in FIG. 1, instances may have operating systems (OS), language runtimes, and containers. The containers may have individual copies of the OS and the language runtimes and user codes loaded thereon. In the example of FIG. 1, the active pool 140A managed by the worker manager 140 includes the instances 156, 157, 158, 159. The instance 156 has containers 156A, 156B. The container 156A has OS 156A-1, runtime 156A-2, and code 156A-3 loaded therein. In the depicted example, the container 156A has its own OS, runtime, and code loaded therein. In one embodiment, the OS 156A-1 (e.g., the kernel thereof), runtime 156A-2, and/or code 156A-3 are shared among the containers 156A, 156B (and any other containers not illustrated in FIG. 1). In another embodiment, the OS 156A-1 (e.g., any code running outside the kernel), runtime 156A-2, and/or code 156A-3 are independent copies that are created for the container 156A and are not shared with other containers on the instance 156. In yet another embodiment, some portions of the OS 156A-1, runtime 156A-2, and/or code 156A-3 are shared among the containers on the instance 156, and other portions thereof are independent copies that are specific to the container 156A. The instance 157 includes containers 157A, 157B, 157C. The instance 158 includes containers 158A, 158B. The instance 159 includes a container 159A.

In the example of FIG. 1, the sizes of the containers depicted in FIG. 1 may be proportional to the actual size of the containers. For example, the container 156A occupies more space than the container 156B on the instance 156. Similarly, the containers 157A, 157B, 157C may be equally sized, and the containers 158A, 158B, 159A may be equally sized. The dotted boxes labeled "C" shown in the instances 158, 159 indicate the space remaining on the instances that may be used to create new instances. In some embodiments, the sizes of the containers may be 64 MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance.

Although the components inside the containers 156B, 157A, 157B, 157C, 158A, 158B, 159A are not illustrated in the example of FIG. 1, each of these containers may have various operating systems, language runtimes, libraries, and/or user code. In some embodiments, instances may have user codes loaded thereon (e.g., in an instance-level cache), and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

After a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156A-3 shown in the container 156A), the worker manager 140 may assign the container to the request and cause the user code to be executed in the container. Alternatively, if the user code is available in the local cache of one of the virtual machine instances (e.g., stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. In some embodiments, the virtual compute system 110 may maintain a separate cache in which user codes are stored to serve as an intermediate level of caching system between the local cache of the virtual machine instances and a web-based network storage (e.g., accessible via the network 104).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The capacity manager 150 manages the capacity available on the virtual compute system 110. For example, the capacity manager 150 may communicate with the frontend 120, the warming pool manager 130, and/or the worker manager 140 to monitor and manage the compute capacity in the warming pool 130A and/or the active pool 140A. Although the capacity manager 150 is illustrated as a distinct component within the virtual compute system 110, part or all of the functionalities of the capacity manager 150 may be performed by the frontend 120, the warming pool manager 130, and/or the worker manager 140. For example, the capacity manager 150 may be implemented entirely within one of the other components of the virtual compute system 110 or in a distributed manner across the other components of the virtual compute system 110. In the example of FIG. 1, the capacity manager 150 includes capacity management data 150A. The capacity management data 150A may include data regarding the history of incoming requests, capacity in the warming pool 130A, capacity in the active pool 140A, and any other metric that may be used by the capacity manager 150 to adjust and/or optimize the capacity available on the virtual compute system 110. The capacity management data 150A may also include any management policies specified by the users or determined by the capacity manager 150 for managing the capacity on the virtual compute system 110.

In some embodiments, the capacity manager 150 may cause additional instances to be added to the warming pool 130A based on the rate at which requests are received by the virtual compute system 110. For example, the capacity manager 150 may monitor the rate of change (e.g., first derivative) in the volume of requests received by the virtual compute system 110 and adjust the rate at which new instances are added to the warming pool 130A. For example, if the traffic is fairly constant (e.g., the rate of change is within a certain threshold from zero), the capacity manager 150 may cause an instance to be added to the warming pool 130A every time an instance is taken out of the warming pool 130A. On the other hand, if the traffic is increasing at a certain rate higher than a threshold rate, the capacity manager 150 may cause an increased amount of instances to be added to the warming pool 130A every time an instance is taken out of the warming pool 130A (e.g., to stay ahead of the increasing traffic).

In some embodiments, the capacity manager 150 may cause additional instances to be added to the warming pool 130A based on the capacity available in the warming pool 130A For example, if the capacity manager 150 determines that the capacity available in the warming pool 130A has fallen below a threshold percentage of the number of instances in the active pool 140A (or a threshold value proportional to the number of requests being received by the virtual compute system 110), the capacity manager 150 may cause instances to be added to the warming pool 130A so that the capacity available in the warming pool 130A is back up at least to the threshold percentage or threshold value. In some embodiments, depending on how fast the capacity available in the warming pool 130A is falling or how low the capacity is, the capacity manager 150 may notify a system administrator. For example, if the policy determined by the capacity manager 150 is to maintain 500 instances (or 50% of the number of instances in the active pool) in the warming pool 130A and the capacity manager 150 detects that only 450 instances are available at a given point in time (e.g., the warming pool 130A has fallen behind schedule by 50 instances), the capacity manager 150 may start adding 10 instances for every instance that leaves the warming pool 130A to catch up. If the capacity manager 150 detects that only 250 instances are available at a given point in time, the capacity manager 150 may start adding 100 instances for every instance that leaves the warming pool 130A to catch up even faster, as well as notify a system administrator to alert him or her of the situation. In some embodiments, the capacity manger 130 may notify both a service provider (e.g., instance provisioning service 109) providing the virtual machine instances to be added to the warming pool 130A (or a system administrator thereof) and a system administrator of the virtual compute system 110.

In some embodiments, the capacity manager 150 may vary the type of instances that are added to the warming pool 130A and the rate at which those instances are added to the warming pool 130A. For example, if the capacity manager 150 determines that instances that are configured to execute user code written in Python are decreasing at a faster rate than instances that are configured to execute user code written in Ruby. In such a case, the capacity manager 150 may cause Python-configured instances to be added to the warming pool at a faster rate than Ruby-configured instances. In some embodiments, the capacity manager 150 may maintain certain percentages or amounts of different types of configurations of the virtual machine instances in the warming pool 130A. For example, the capacity manager 150 may cause the warming pool 130A to have 30% Type A instances, 30% Type B instances, and 40% Type C instances, where each of Type A-C may correspond to a particular combination of software components including operating systems, language runtimes, libraries, etc.

In some embodiments, the virtual compute system 110 may comprise one or more knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In such a case, the capacity manager 150 may monitor and adjust the capacity in the warming pool 130A according to the policy indicated by the knob or switch.

In some embodiments, the capacity manager 150 may deallocate (e.g., destroy, terminate, shut down, remove, etc.) containers that are in the active pool 140A based on how many requests the virtual compute system 110 is receiving at the moment. For example, depending on the number of concurrent requests (e.g., multiple requests that are trying to use the same resources such as the container and/or the user code loaded in the container) in the last 60 seconds, the capacity manager 150 may cause one or more of the existing containers to be deallocated. Alternatively, or additionally, depending on how many containers (e.g., containers having the same user code loaded therein) are idle (e.g., not currently assigned to a request or not currently running user code), the capacity manager 150 may cause one or more of the existing containers to be deallocated. In some embodiments, the capacity manager 150 may deallocate containers based on the state of the instances (e.g., utilization). For example, if there exist several instances in the active pool 140A that belong to the same user, but each of the instances are only minimally utilized, the capacity manager 150 may cause some of those instances to be shut down and the containers in those instances to be copied onto the remaining instances that are assigned to the same user. For example, if the capacity manager 150 determines that the utilization level of the instances is below a certain threshold level, the capacity manager 150 may start consolidating some of the instances to increase the utilization level above the threshold level. In one example, the capacity manager 150 may start directing requests that would have been assigned to a container on a particular instance that is under-utilized to containers on other instances in order to let any code currently running on the particular instance to finish running and terminate the particular instance. In another example, the capacity manager 150 may start consolidating the instances by copying containers of one instance onto other instances assigned to the same user with available capacity and shutting down the instance. For example, the capacity manager 150 may perform such consolidation when utilization falls below 50%, and the capacity manager 150 may continue the consolidation process until utilization is above 80%. The threshold percentage may be lower for users who have a large number of requests for the virtual compute system 110 (e.g., large customers), and the threshold percentage may be higher for users who have a relatively small number of requests for the virtual compute system 110 (e.g., small customers).

In some embodiments, the capacity manager 150, based on the history of the volume of requests received by the virtual compute system 110, determines the amount of capacity that should be available in the warming pool 130A. For example, if the capacity manager 150 determines that the virtual compute system 110, on average, receives 50% more requests between the hours of 7 PM and 8 PM, the capacity manager 150 may cause the warming pool 130A (or cause the combination of the warming pool 130A and the currently available capacity in the active pool 140A) to include 50% more capacity (e.g., virtual machine instances) during those hours. In some embodiments, users may specify that they want a certain amount of compute capacity during a period specified by the user. For example, the virtual compute system 110 may provide a user interface to the users, and the users may specify how much compute capacity they want the virtual compute system 110 to guarantee them based on their expected needs.

In some embodiments, if the capacity manager 150 determines that a particular user is responsible for a large number of requests received by the virtual compute system 110, the capacity manager 150 may create a separate pool within the warming pool 130A that is used to prepare instances that can be used to service the user's requests. In such embodiments, user-specific operating systems, language runtimes, libraries, and/or codes may be loaded onto the instances in the separate pool and the containers created on those instances such that those instances and containers are ready to service requests from the particular user when they are received by the virtual compute system 110.

The capacity manager 150 may include a request and capacity monitoring unit for monitoring the requests received by the virtual compute system 110 and the compute capacity (e.g., containers) available on the virtual compute system 110 to service incoming code execution requests, and a management policy unit for managing the management policies that may be used to dictate how compute capacity of the virtual compute system 110 should be managed. An example configuration of the capacity manager 150 is described in greater detail below with reference to FIG. 5.

Figure 2:
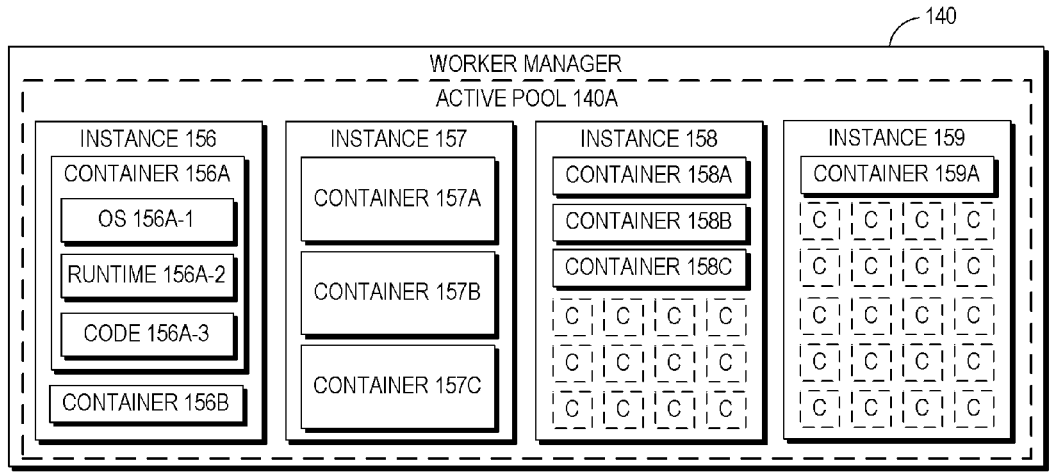
FIG. 2 is a block diagram depicting an illustrative configuration of an active pool, according to an example aspect.
Figure 3:
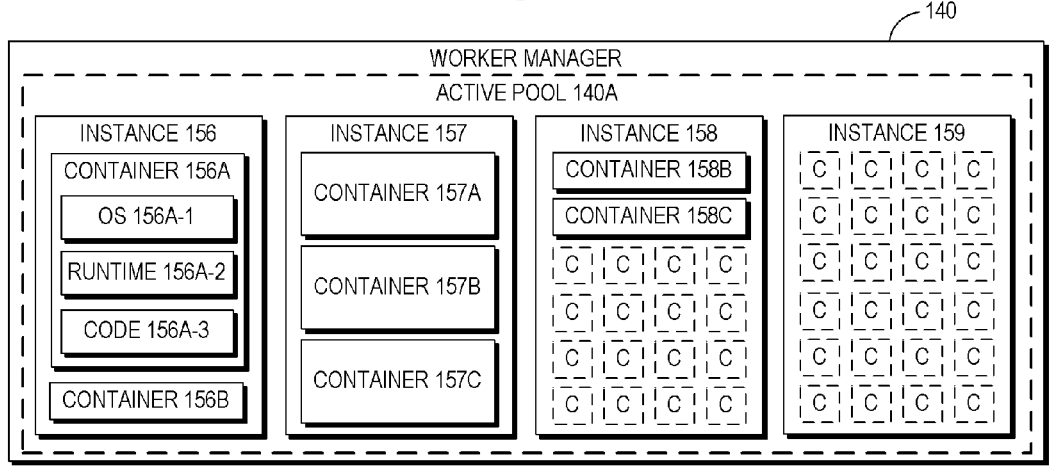
FIG. 3 is a block diagram depicting another illustrative configuration of the active pool, according to an example aspect.
Figure 4:
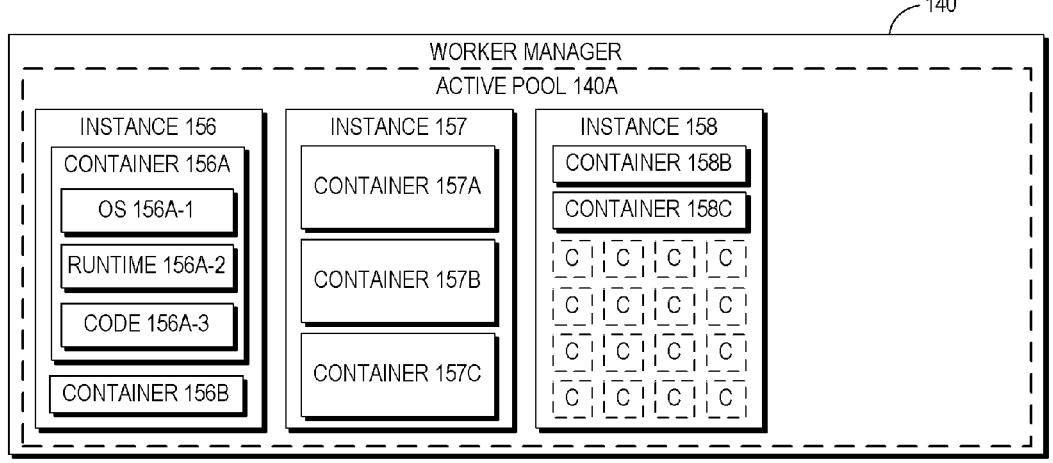
FIG. 4 is a block diagram depicting another illustrative configuration of the active pool, according to an example aspect.

With reference to FIGS. 2-4, the worker manager 140 at a subsequent point in time will be described. In the example of FIG. 2, the instance 158 has a new container 158C for servicing a request that has been received. The request would normally have been serviced by a container on the instance 159, since the instance 158, 159 are assigned to the same user and the instance 159 has more capacity available. However, the capacity manager 150 has intervened and caused the new request to be assigned to the new container 158C on the instance 158, in order to terminate the instance 159 once the container 159A finishes running the code therein.

In FIG. 3, the user code in the container 158A and the user code in the container 159A have both finished running, and the containers 158A, 159A have been terminated. As shown in FIG. 3, the instance 159 no longer has any container. In FIG. 4, the capacity manager 150 has caused the instance 159 to be terminated. By removing such under-utilized instances (e.g., the instance 159 of FIGS. 1-3), the cost associated with maintaining such under-utilized instances in the active pool 140A can be eliminated or reduced. Other components shown in FIGS. 2-4 are identical to those shown in FIG. 1 and the details thereof are thus omitted for brevity.

Figure 5:
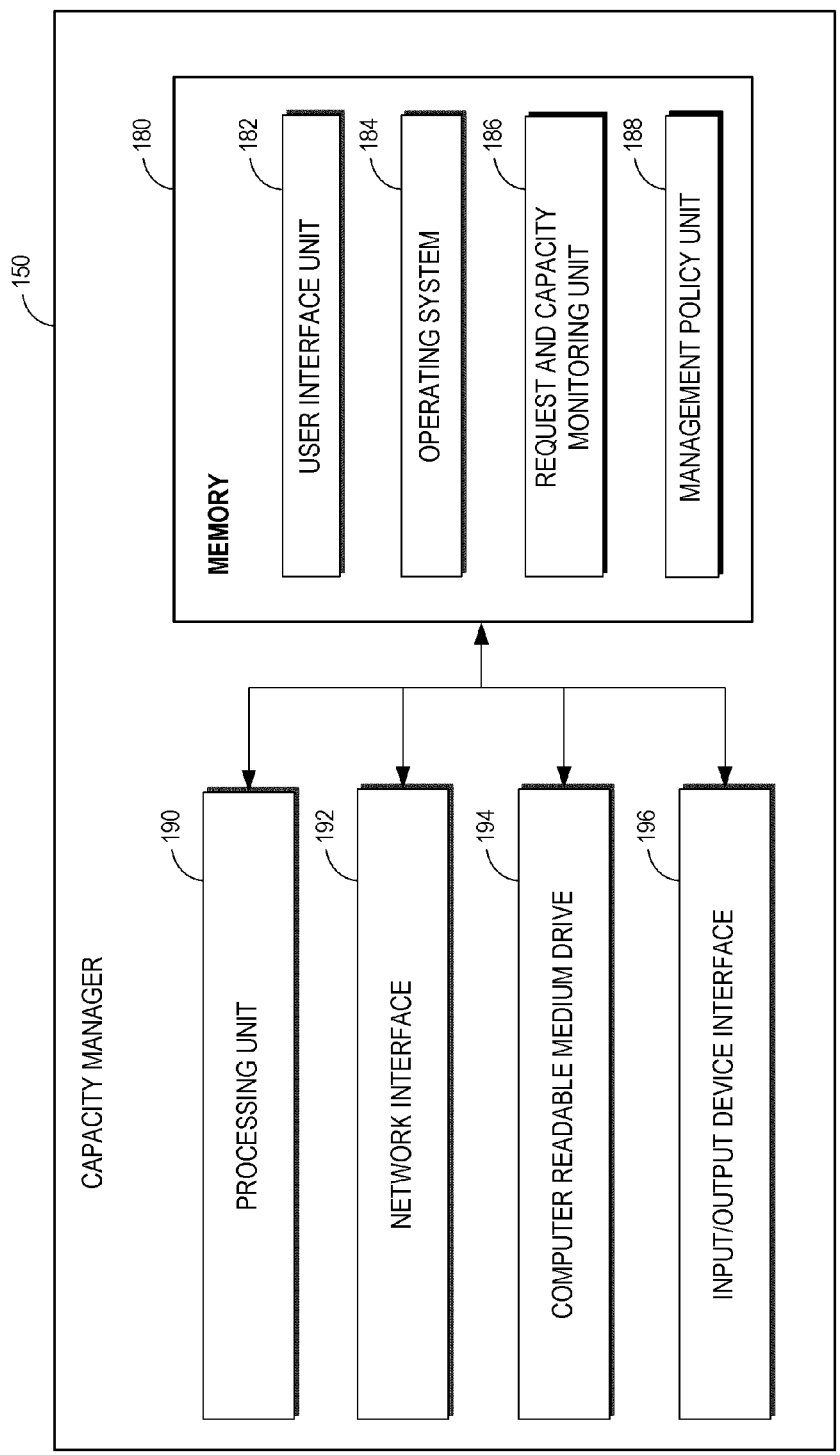
FIG. 5 depicts a general architecture of a computing device providing a capacity manager for managing low latency compute capacity, according to an example aspect.

FIG. 5 depicts a general architecture of a computing system (referenced as capacity manager 150) that manages the virtual machine instances in the virtual compute system 110. The general architecture of the capacity manager 150 depicted in FIG. 5 includes an arrangement of computer hardware and software modules that may be used to implement aspects of the present disclosure. The capacity manager 150 may include many more (or fewer) elements than those shown in FIG. 5. It is not necessary, however, that all of these generally conventional elements be shown in order to provide an enabling disclosure. As illustrated, the capacity manager 150 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the capacity manager 150. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a request and capacity monitoring unit 186 and a management policy unit 188 that may be executed by the processing unit 190. In one embodiment, the user interface unit 182, request and capacity monitoring unit 186, and management policy unit 188 individually or collectively implement various aspects of the present disclosure, e.g., monitoring the requests received by the virtual compute system 110, monitoring the compute capacity (e.g. containers), either in use or ready to be used, managing the compute capacity based on one or more management policies, etc. as described further below.

The request and capacity monitoring unit 186 monitors incoming code execution requests and compute capacity in the warming pool 130A and the active pool 140A. For example, the request and capacity monitoring unit 186 monitors incoming code execution requests and identifies any trends (e.g., peak hours) that may be used to better manage the capacity on the virtual compute system 110. The request and capacity monitoring unit 186 may keep track of the number of incoming requests for each hour of the day, each day of the week, and each month of the year.

The management policy unit 188 manages management policies either specified by the users or determined by the capacity manager 150. The management policies govern how the capacity manager 150 behaves. For example, a user may specify that he or she needs a certain amount of capacity during a certain period of time, the management policy unit 188 may record that in a management policy for the user, so that the capacity manger 150 can manage the capacity for the user accordingly. In some embodiments, when the request and capacity monitoring unit 186 has identified certain trends, such trends may be incorporated into a management policy, so that the capacity manger 150 can manage the capacity on the virtual compute system 110 accordingly.

While the request and capacity monitoring unit 186 and the management policy unit 188 are shown in FIG. 5 as part of the capacity manager 150, in other embodiments, all or a portion of the request and capacity monitoring unit 186 and the management policy unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the capacity manager 150.

Figure 6:
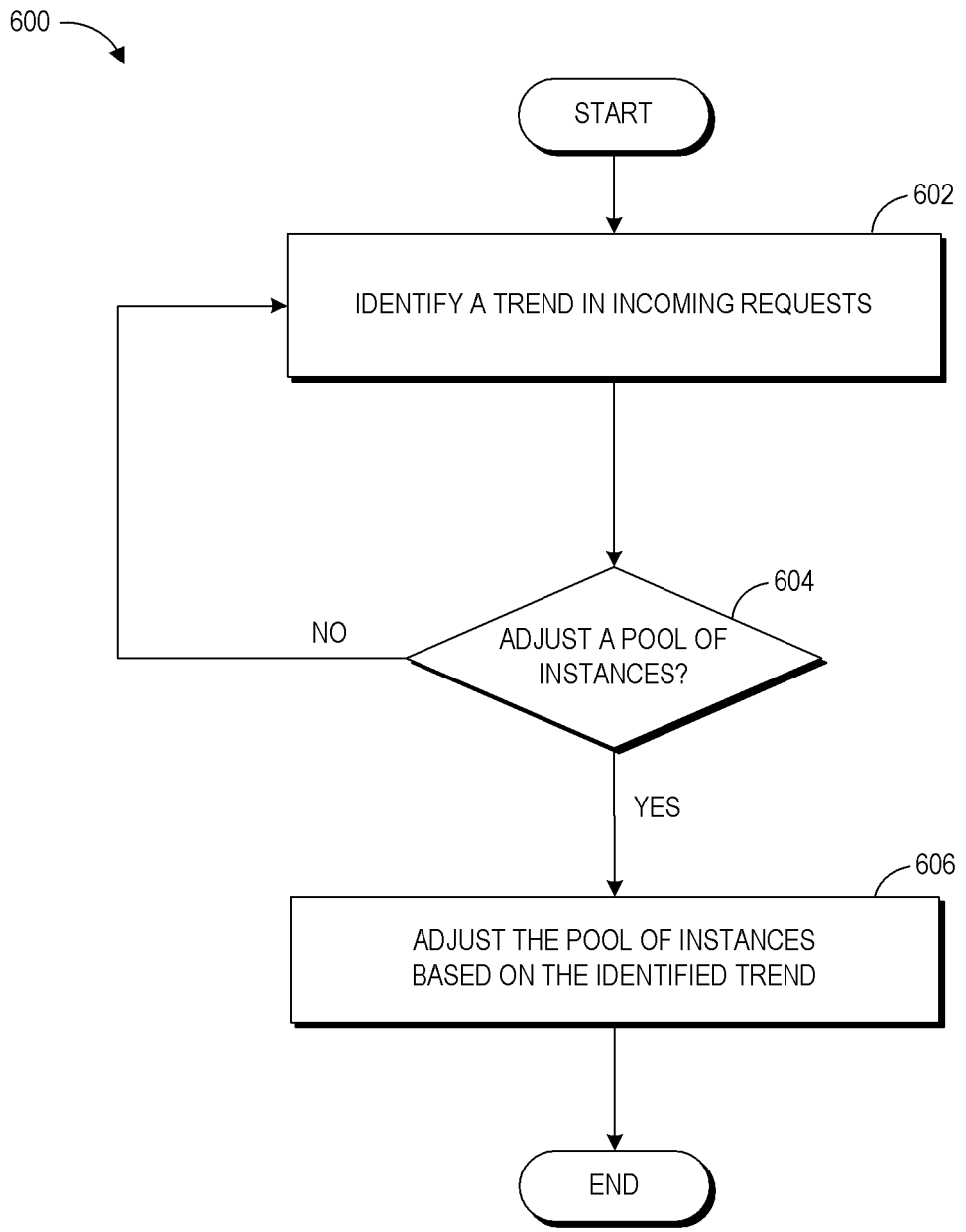
FIG. 6 is a flow diagram illustrating a low latency compute capacity management routine implemented by a capacity manager, according to an example aspect.

Turning now to FIG. 6, a routine 600 implemented by one or more components of the virtual compute system 110 (e.g., the capacity manager 150) will be described. Although routine 600 is described with regard to implementation by the capacity manager 150, one skilled in the relevant art will appreciate that alternative components may implement routine 600 or that one or more of the blocks may be implemented by a different component or in a distributed manner.

At block 602 of the illustrative routine 600, the capacity manager 150 monitors incoming requests that are received by the virtual compute system 110 and the capacity available in the warming pool 130A and the active pool 140A and identifies a trend in the incoming requests. The capacity manager 150 may record the results of the monitoring in a database (e.g., capacity management data 150A). Some of the metrics utilized by the capacity manager 150 may include requests per second, requests per time of day, requests per user, utilization percentage, etc.

Next, at block 604, the capacity manager 150 determines whether the warming pool 130A, the active pool 140A, or both should be adjusted, for example, based on the capacity management data 150A. For example, the capacity manager 150 may determine that not enough capacity or too much capacity is available in the warming pool 130A in view of the incoming requests. In another example, the capacity manager 150 may determine that some of the instances in the active pool 140A are under-utilized and the volume of incoming requests (e.g., if the volume is below a certain threshold) justifies a consolidation of those instances. In another example, the capacity manager 150 may determine, based on the incoming requests, that a particular user has satisfied the criteria for being categorized as a high-volume user who should have his or her own fleet of virtual machine instances in the warming pool 130A. In another example, the capacity manager 150 may determine that a particular user policy dictates that the capacity in the warming pool 130A and/or the active pool 140A be increased or decreased.

At block 606, the capacity manager 150 adjusts the warming pool 130A, the active pool 140A, or both according to the determination made at block 604. For example, the capacity manager 150 may communicate with the warming pool manager 130 and/or the worker manager 140 in order to have the capacity adjusted.

While the routine 600 of FIG. 6 has been described above with reference to blocks 602-606, the embodiments described herein are not limited as such, and one or more blocks may be omitted, modified, or switched without departing from the spirit of the present disclosure.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for providing low-latency computational capacity from a virtual compute fleet, the system comprising:

an electronic data store configured to store at least a program code of a user; and a virtual compute system comprising one or more hardware computing devices executing specific computer-executable instructions, said virtual compute system in communication with the data store, and configured to at least:

maintain a plurality of virtual machine instances on one or more physical computing devices, wherein the plurality of virtual machine instances comprise:

a warming pool comprising virtual machine instances having one or more software components loaded thereon; and an active pool comprising virtual machine instances assigned to one or more users, wherein the virtual compute system is configured to add a first number of virtual machine instances to the warming pool in response to a first virtual machine instance being removed from the warming pool;

monitor incoming code execution requests to execute program codes on the virtual compute system, the incoming code execution requests comprising information usable for identifying the respective program codes to be executed on the virtual compute system;

determine a current rate at which the incoming code execution requests are received;

determine whether the current rate at which the incoming code execution requests are received satisfies a threshold condition for adjusting the warming pool; and in response to determining that the current rate at which the incoming code execution requests are received satisfies the threshold condition, adjust a rate at which additional virtual machine instances are added to the warming pool such that a second number of virtual machine instances are added to the warming pool in response to a second virtual machine instance being removed from the warming pool, wherein the second number and is different from the first number and determined based on the current rate at which the incoming code execution requests are received.

2. The system of claim 1, wherein the virtual compute system is further configured to:

determine that a utilization level of an under-utilized virtual machine instance in the active pool is below a threshold value, wherein the under-utilized virtual machine instance has one or more containers running one or more program codes therein;

refrain from routing additional code execution requests to the under-utilized virtual machine instance until the one or more containers have completed running the one or more program codes therein; and terminate the under-utilized virtual machine instance after the one or more containers have completed running the one or more program codes therein.

3. The system of claim 1, wherein the virtual compute system is further configured to create a sub-pool of virtual machine instances within the warming pool, wherein the sub-pool of virtual machine instances are configured to service requests associated with a particular user and the virtual machine instances in the sub-pool have one or more containers have a software configuration that is specific to the particular user.

4. A system, comprising:
a virtual compute system comprising one or more hardware computing devices executing specific computer-executable instructions and configured to at least:
maintain a pool of virtual machine instances on one or more physical computing devices such that a first number of virtual machine instances are added to the plurality pool of virtual machine instances in response to a first virtual machine instance being removed from the pool, determine a current rate at which incoming code execution requests are received;

determine whether the current rate at which the incoming code execution requests are received satisfies a threshold condition for adjusting the pool of virtual machine instances; and in response to determining that the current rate at which the incoming code execution requests are received satisfies the threshold condition, adjust a rate at which additional virtual machine instances are added to the pool such that a second number of virtual machine instances are added to the pool in response to a second virtual machine instance being removed from the pool, wherein the second number is different from the first number and determined based on the current rate at which the incoming code execution requests are received.

5. The system of claim 4, wherein the plurality pool of virtual machine instances comprises an active pool of virtual machine instances, and wherein the virtual compute system is further configured to:
determine that a virtual machine instance should be removed from the active pool, wherein the virtual machine instance has one or more containers running one or more program codes therein;

refrain from routing additional code execution requests to the virtual machine instance until the one or more program codes have finished running; and terminate the virtual machine instance after the one or more program codes have finished running.

6. The system of claim 4, wherein the pool of virtual machine instances comprises a warming pool of virtual machine instances having one or more software components loaded thereon, and wherein the virtual compute system is further configured to:
determine that an available capacity of the warming pool is below a first threshold capacity; and add virtual machine instances to the warming pool until the available capacity of the warming pool is above the first threshold capacity.

7. The system of claim 6, wherein the virtual compute system is further configured to:
determine that the available capacity of the warming pool is below a second threshold capacity that is lower than the first threshold capacity; and take at least one additional predetermined action, wherein the at least one additional predetermined action comprises at least one of notifying a system administrator or contacting a service provider providing the virtual machine instances in response to determining that the available capacity of the warming pool is below the second threshold capacity.

8. The system of claim 6, wherein the virtual compute system is further configured to:
forecast a need for additional virtual machine instances based on the current rate; and adjust a rate at which new virtual machine instances are added to the warming pool.

9. The system of claim 4, wherein the pool of virtual machine instances comprises a warming pool of virtual machine instances having one or more software components loaded thereon, and wherein the virtual compute system is configured to create a sub-pool of virtual machine instances within the warming pool, wherein the sub-pool of virtual machine instances are configured to service code execution requests associated with a particular user.

10. The system of claim 4, wherein the virtual compute system is configured to adjust the pool of virtual machine instances based at least in part on a user policy specified by a user, the user policy indicating an amount of compute capacity that the user desires during a specified time period.

11. The system of claim 4, wherein the virtual compute system is further configured to:
maintain a historical trend associated with a particular user; and adjust the pool of virtual machine instances based at least in part on the maintained historical trend on the particular user's behalf.

12. The system of claim 4, wherein the pool of virtual machine instances comprises a warming pool of virtual machine instances having one or more software components loaded thereon, and wherein the virtual compute system is further configured to:
maintain a first pool of virtual machine instances having a first set of software components loaded thereon and a second pool of virtual machine instances having a second set of software components loaded thereon, wherein the first set of software components include at least one software component not included in the second set of software components;

detect a difference in rates of change in size of the first and second pools; and adjust a rate at which virtual machine instances are added to at least one of the first pool or the second pool based on the detected difference.

13. A computer-implemented method comprising:
as implemented by one or more computing devices configured with specific executable instructions,
maintaining a pool of virtual machine instances on one or more physical computing devices such that a first number of virtual machine instances are added to the plurality pool of virtual machine instances in response to a first virtual machine instance being removed from the pool;

determining a current rate at which incoming code execution requests are received;

determining whether the current rate at which the incoming code execution requests are received satisfies a threshold condition for adjusting the pool of virtual machine instances; and in response to determining that the current rate at which the incoming code execution requests are received satisfies the threshold condition, adjusting a rate at which additional virtual machine instances are added to the pool such that a second number of virtual machine instances are added to the pool in response to a second virtual machine instance being removed from the pool, wherein the second number is different from the first number and determined based on the current rate at which the incoming code execution requests are received.

14. The computer-implemented method of claim 13, wherein the pool of virtual machine instances comprises an active pool of virtual machine instances, and wherein the method further comprises:

determining that a virtual machine instance should be removed from the active pool, wherein the virtual machine instance has one or more containers running one or more program codes therein;

refraining from routing additional code execution requests to the virtual machine instance until the one or more program codes have finished running; and terminating the virtual machine instance after the one or more program codes have finished running.

15. The computer-implemented method of claim 13, wherein the pool of virtual machine instances comprises a warming pool of virtual machine instances having one or more software components loaded thereon, and wherein the method further comprises:

determining that an available capacity of the warming pool is below a first threshold capacity; and adding virtual machine instances to the warming pool until the available capacity of the warming pool is above the first threshold capacity.

16. The computer-implemented method of claim 15, wherein the method further comprises:

determining that the available capacity of the warming pool is below a second threshold capacity that is lower than the first threshold capacity; and taking at least one additional predetermined action, wherein the at least one additional predetermined action comprises at least one of notifying a system administrator or contacting a service provider providing the virtual machine instances in response to determining that the available capacity of the warming pool is below the second threshold capacity.

17. The computer-implemented method of claim 13, wherein the pool of virtual machine instances comprises a warming pool of virtual machine instances having one or more software components loaded thereon, and wherein the method further comprises creating a sub-pool of virtual machine instances within the warming pool, wherein the sub-pool of virtual machine instances are configured to service code execution requests associated with a particular user.

18. Non-transitory physical computer storage storing computer executable instructions that, when executed by one or more computing devices, configure the one or more computing devices to:

maintain a pool of virtual machine instances on one or more physical computing devices such that a first number of virtual machine instances are added to the pool of virtual machine instances in response to a first virtual machine instance being removed from the pool;

determine a current rate at which incoming code execution requests are received;

determine whether the current rate at which the incoming code execution requests are received satisfies a threshold condition for adjusting the plurality pool of virtual machine instances; and in response to determining that the current rate at which the incoming code execution requests are received satisfies the threshold condition, adjust a rate at which additional virtual machine instances are added to the pool such that a second number of virtual machine instances are added to the pool in response to a second virtual machine instance being removed from the pool, wherein the second number is different from the first number and determined based on the current rate at which the incoming code execution requests are received.

19. The non-transitory physical computer storage of claim 18, wherein the pool of virtual machine instances comprises an active pool of virtual machine instances, and wherein the instructions further configure the one or more computing devices to:

determine that a virtual machine instance should be removed from the active pool, wherein the virtual machine instance has one or more containers running one or more program codes therein;

refrain from routing additional code execution requests to the virtual machine instance until the one or more program codes have finished running; and terminate the virtual machine instance after the one or more program codes have finished running.

20. The non-transitory physical computer storage of claim 18, wherein the pool of virtual machine instances comprises a warming pool of virtual machine instances having one or more software components loaded thereon, and wherein the instructions further configure the one or more computing devices to:

determine that an available capacity of the warming pool is below a first threshold capacity; and add virtual machine instances to the warming pool until the available capacity of the warming pool is above the first threshold capacity.

21. The non-transitory physical computer storage of claim 20, wherein the instructions further configure the one or more computing devices to:

determine that the available capacity of the warming pool is below a second threshold capacity that is lower than the first threshold capacity; and take at least one additional predetermined action, wherein the at least one additional predetermined action comprises at least one of notifying a system administrator or contacting a service provider providing the virtual machine instances in response to determining that the available capacity of the warming pool is below the second threshold capacity.

22. The non-transitory physical computer storage of claim 18, wherein the pool of virtual machine instances comprises a warming pool of virtual machine instances having one or more software components loaded thereon, and wherein the instructions further configure the one or more computing devices to create a sub-pool of virtual machine instances within the warming pool, wherein the sub-pool of virtual machine instances are configured to service code execution requests associated with a particular user.

* * * * *

UNITED STATES PATENT AND TRADEMARK OFFICE
CERTIFICATE OF CORRECTION

PATENT NO. : 9,830,193 B1  
APPLICATION NO. : 14/502714  
DATED : November 28, 2017  
INVENTOR(S) : Timothy Allen Wagner It is certified that error appears in the above-identified patent and that said Letters Patent is hereby corrected as shown below:

In the Claims

In Column 20 at Line 63, In Claim 1, change "number and" to --number--.

In Column 21 at Line 28, In Claim 4, change "plurality pool" to --pool--.

In Column 21 at Line 48, In Claim 5, change "plurality pool" to --pool--.

In Column 22 at Line 65, In Claim 13, change "plurality pool" to --pool--.

In Column 24 at Line 8, In Claim 18, change "plurality pool" to --pool--.

Signed and Sealed this  
Fifteenth Day of May, 2018

Andrei Iancu  
*Director of the United States Patent and Trademark Office*